United States Patent
Delaney et al.

(10) Patent No.: US 12,058,413 B2
(45) Date of Patent: Aug. 6, 2024

(54) PLAYING A MEDIA SELECTION BASED ON AN ANTICIPATED ACTIVITY

(71) Applicant: Lenovo (United States) Inc., Morrisville, NC (US)

(72) Inventors: Mark Delaney, Raleigh, NC (US); Nathan Peterson, Oxford, NC (US); John C. Mese, Cary, NC (US); Arnold Weksler, Raleigh, NC (US); Russell Speight VanBlon, Raleigh, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 17/702,623

(22) Filed: Mar. 23, 2022

(65) Prior Publication Data
US 2023/0328317 A1    Oct. 12, 2023

(51) Int. Cl.
*H04N 21/442* (2011.01)
*H04N 21/466* (2011.01)

(52) U.S. Cl.
CPC . *H04N 21/44222* (2013.01); *H04N 21/44218* (2013.01); *H04N 21/4667* (2013.01)

(58) Field of Classification Search
None
See application file for complete search history.

(56) References Cited

U.S. PATENT DOCUMENTS

| | | | |
|---|---|---|---|
| 2007/0033531 A1* | 2/2007 | Marsh | G06F 16/9535 707/E17.108 |
| 2009/0024559 A1* | 1/2009 | Arrasvuori | G06F 16/907 |
| 2015/0088423 A1* | 3/2015 | Tuukkanen | G01C 21/26 701/538 |
| 2015/0168150 A1* | 6/2015 | Kahn | G01C 21/3617 701/538 |
| 2015/0350406 A1* | 12/2015 | Zhu | H04W 4/80 705/7.19 |
| 2016/0037209 A1* | 2/2016 | Miyoshi | H04N 21/4223 725/85 |
| 2016/0360336 A1* | 12/2016 | Gross | H04W 4/025 |
| 2017/0031907 A1* | 2/2017 | Juang | G06F 16/435 |
| 2017/0358022 A1* | 12/2017 | Deak | G06Q 30/0631 |
| 2018/0035254 A1* | 2/2018 | Zhang | H04L 67/306 |
| 2019/0007740 A1* | 1/2019 | Kveton | H04N 21/42201 |
| 2019/0065969 A1* | 2/2019 | Shaw | H04N 21/4516 |
| 2019/0149879 A1* | 5/2019 | Siddiq | H04N 21/4532 725/14 |
| 2019/0222895 A1* | 7/2019 | Petander | H04N 21/41407 |

* cited by examiner

*Primary Examiner* — Alexander Q Huerta
(74) *Attorney, Agent, or Firm* — Kunzler Bean & Adamson

(57) ABSTRACT

Methods, apparatus, and computer program products that can play a media selection based on an anticipated activity are disclosed herein. One method includes determining, by a processor, an anticipated activity for a user based on one or more actions being currently performed by the user, determining a media selection for the user based on the determined anticipated activity, and playing the determined media selection. Apparatus and computer program products that include hardware and/or software that can perform the methods for playing a media selection based on an anticipated activity are also disclosed herein.

20 Claims, 13 Drawing Sheets

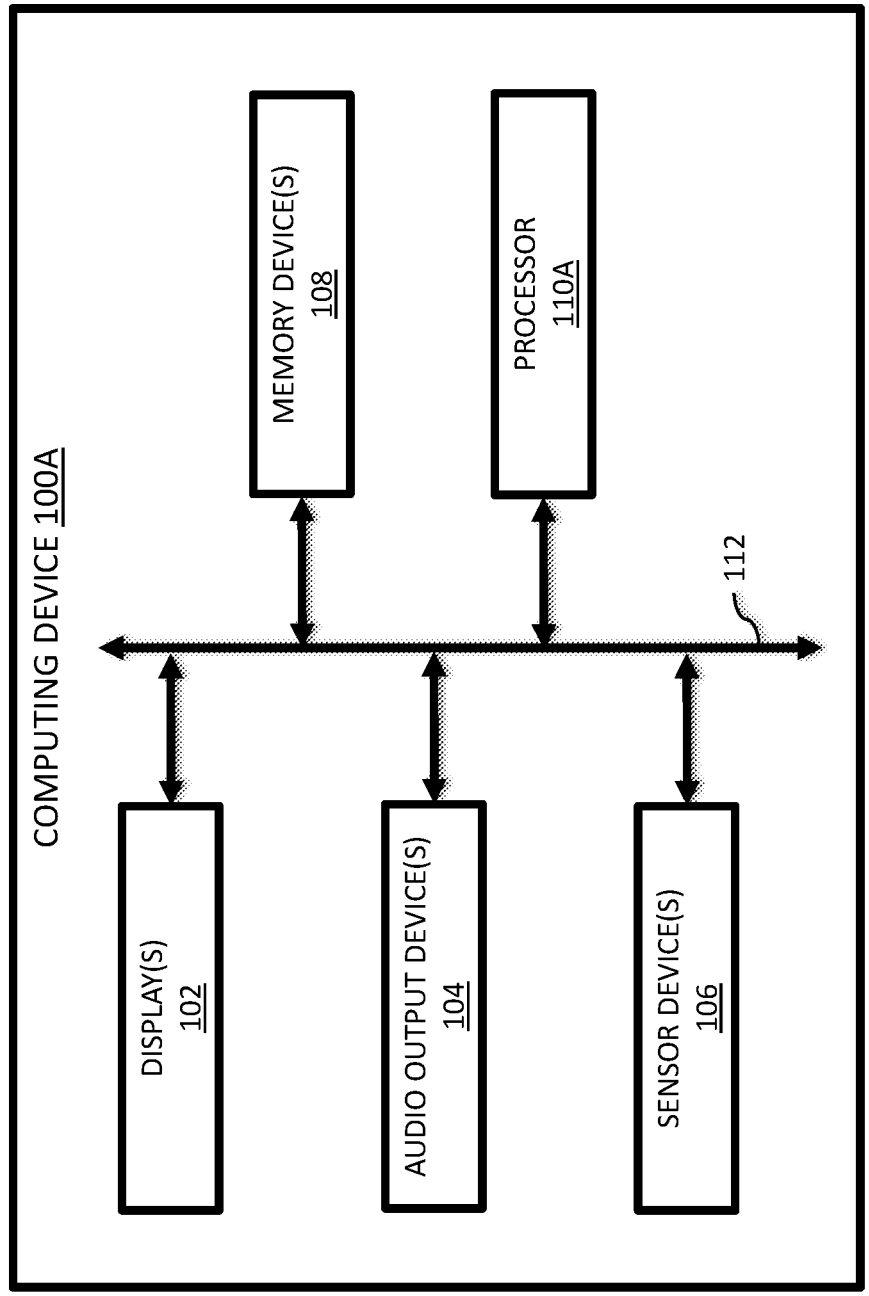

PLAYING A MEDIA SELECTION BASED ON AN ANTICIPATED ACTIVITY

FIELD

The subject matter disclosed herein relates to computing devices and, more particularly, relates to playing a media selection based on an anticipated activity.

BACKGROUND

Currently, media selection is not curated from what a user is currently doing or is about to be doing because media suggestions are typically tied to a user profile and not to a current and/or future activity. As such, contemporary computing devices require the user to input media selections when performing specific activities and/or future activities.

BRIEF SUMMARY

Apparatus, methods, and computer program products that can play a media selection based on an anticipated activity are disclosed herein. An apparatus, in one embodiment, includes a processor and a memory that stores code executable by the processor. In certain embodiments, the code is executable by the processor to determine an anticipated activity for a user based on one or more actions being currently performed by the user, determine a media selection for the user based on the determined anticipated activity, and play the determined media selection.

One embodiment of a method that can play a media selection based on an anticipated activity includes determining, by a processor, an anticipated activity for a user based on one or more actions being currently performed by the user. In some embodiments, the method further includes determining a media selection for the user based on the determined anticipated activity and playing the determined media selection.

A computer program product that can play a media selection based on an anticipated activity includes a computer-readable storage medium including program instructions embodied therewith. In certain embodiments, the program instructions are executable by a processor to cause the processor to determine an anticipated activity for a user based on one or more actions being currently performed by the user, determine a media selection for the user based on the determined anticipated activity, and play the determined media selection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIGS. 1A and 1B are schematic block diagrams illustrating various embodiments of computing device that can play a media selection based on an anticipated activity;

DETAILED DESCRIPTION

Figure 1B:
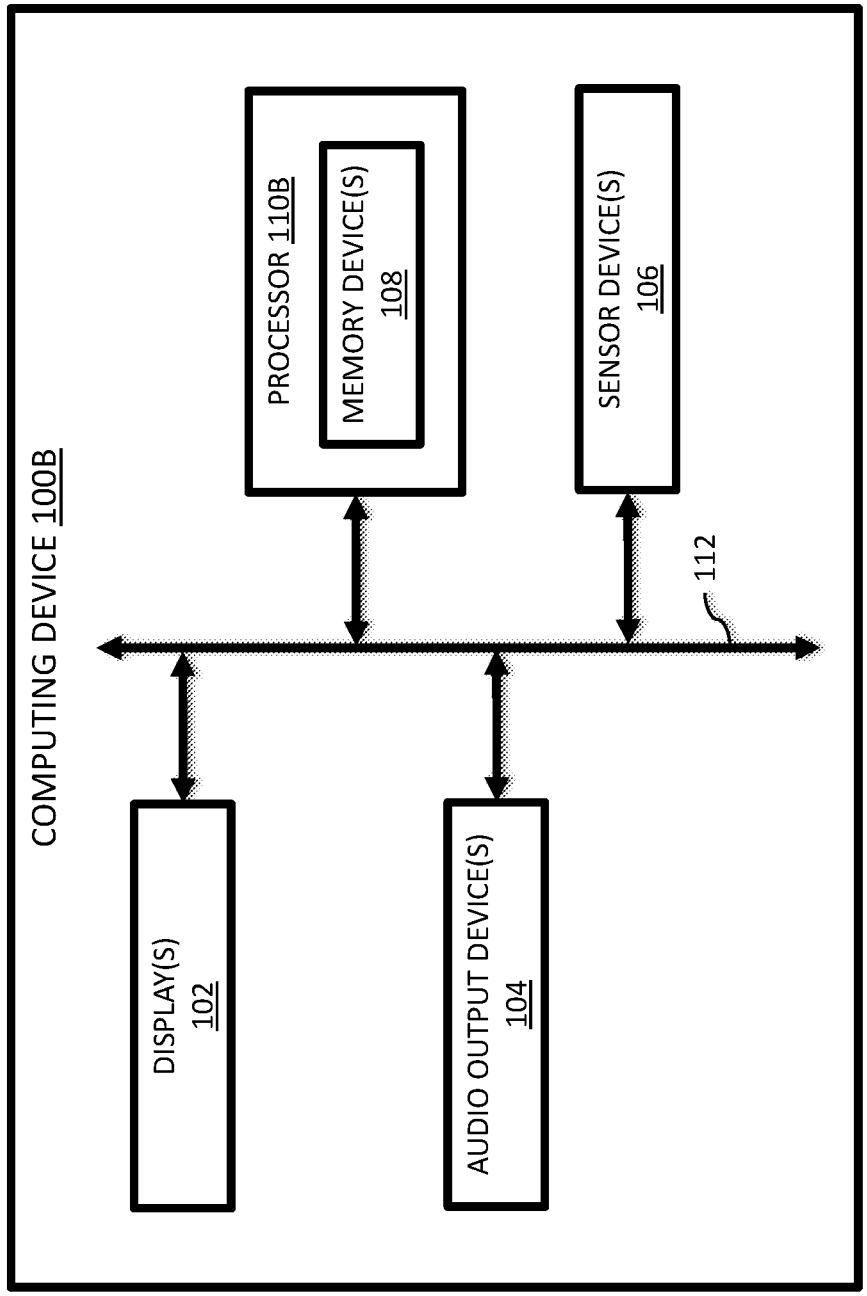

As will be appreciated by one skilled in the art, aspects of the embodiments may be embodied as a system, apparatus, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Various embodiments disclosed herein can include systems, apparatus, methods, and computer program products that can play a media selection based on an anticipated activity. An apparatus, in one embodiment, includes a processor and a memory that stores code executable by the processor. In certain embodiments, the code is executable by the processor to determine an anticipated activity in which a user intends to participate in response to detecting the user performing one or more actions associated with the anticipated activity, determine a media selection for the user based on the determined anticipated activity, and play the determined media selection.

One embodiment of a method that can play a media selection based on an anticipated activity includes determining an anticipated activity in which a user intends to participate in response to detecting the user performing one or more actions associated with the anticipated activity. In some embodiments, the method further includes determining a media selection for the user based on the determined anticipated activity and playing the determined media selection.

A computer program product that can play a media selection based on an anticipated activity includes a computer-readable storage medium including program instructions embodied therewith. In certain embodiments, the program instructions are executable by a processor to cause the processor to determine an anticipated activity in which a user intends to participate in response to detecting the user performing one or more actions associated with the anticipated activity, determine a media selection for the user based on the determined anticipated activity, and play the determined media selection.

Turning now to the drawings, FIGS. 1A and 1B are block diagrams of various embodiments of a computing device 100A and a computing device 100B, respectively. Specifically, the computing devices 100A and 100B illustrated in FIGS. 1A and 1B are each configured to play a media selection based on an anticipated activity. As discussed herein, the computing devices 100A and 100B may simply be referred to individually or collectively as, computing device(s) 100.

A computing device 100 (e.g., computing device 100A and computing device 100B) may include any suitable computing device/system that is known or developed in the future, which can also be referred to herein generally as, an information handling device. Examples of a computing device 100 include, but are not limited to, a laptop computer, a desktop computer, a personal digital assistant (PDA), a tablet computer, a smart phone, a cellular telephone, a smart television (e.g., televisions connected to the Internet), a wearable device (e.g., a smart watch, a smart ring, a fitness tracker, etc.), an Internet of Things (IoT) device, a game console, a vehicle on-board computer, a streaming device, a smart device, and a digital assistant, etc., among other computing devices that are possible and contemplated herein.

At least in the embodiment illustrated in FIG. 1A, a computing device 100A includes, among other components, one or more display devices 102 (or display(s) 102), one or more audio output devices 104, a set of sensor devices 106, a set of memory devices 108 (or memory 108), and at least one processor 110A coupled to and/or in communication with one another via a bus 112 (e.g., a wired and/or wireless bus). At least in the embodiment illustrated in FIG. 1B, a computing device 100B includes, among other components, one or more displays 102, one or more audio output devices 104, a set of sensor device 106, a set of memory devices 108, and at least one processor 108B coupled to and/or in communication with one another via a bus 112. Alternative to the processor 110A in the computing device 100A, the processor 110B in the computing device 100B includes the memory device(s) 108 in the processor 110B, whereas the memory device(s) 108 of the computing device 100A is/are separate and/or independent of the processor 110A. As discussed herein, the processors 110A and 110B may simply be referred to individually or collectively as, processor(s) 110.

In various embodiments, a computing device 100 can include one or more internal and/or built-in displays 102. In additional or alternative embodiments, a computing device 100 can include one or more external displays. As such, various embodiments of a computing device 100 can include one or more internal/built-in displays 102 and/or one or more external displays 102.

A display 102 may include any suitable device, system, hardware, and/or software that is known or developed in the future capable of playing and/or displaying visual elements, visual objects, visual media, visual files, and/or visual media files. Example visual elements, visual objects, visual media, visual files, and/or visual media files include, but are not limited to, a set of applications, a set of images, a set of video feeds, and/or a set of video streams, etc., among other features capable of being displayed on a display 102 that are possible and contemplated herein.

A computing device 100, in various embodiments, can include one or more internal and/or built-in audio output devices 104. In additional or alternative embodiments, a computing device 100 can include one or more external audio output devices 104. As such, various embodiments of a computing device 100 can include one or more internal/built-in audio output devices 104 and/or one or more external audio output devices 104.

An audio output device 104 may include any suitable system(s) and/or device(s) that is/are known or developed in the future capable of playing and/or providing audio elements, sounds, audio feeds, and/or audio streams. In various embodiments, the audio output device 104 can include one or more speakers, a set of headphones, and/or a set of earbuds, etc., among other suitable device(s)/system(s) that can play and/or provide audio elements, sounds, audio feeds, and/or audio streams that are possible and contemplated herein.

A set of sensor devices 106 may include any suitable quantity of sensor devices 106. In some embodiments, the set of sensor devices 106 includes one sensor device 106. In further embodiments, the set of sensor devices 106 includes two or more sensor devices 106.

The set of sensor devices 106 may include any suitable sensor device(s) 106 that is/are known or developed in the future that can detect, sense, and/or measure physical inputs as sensor data indicative of a set of properties and/or conditions of an environment surrounding a sensor device 106. That is, the sensor device(s) 106 can include any suitable device that can read and/or measure motion, sound, light, temperature, speed, and/or electrical capacity, etc. as sensor data, among other types of inputs that can be utilized as sensor data to indicate and/or represent a set of properties and/or conditions of an environment surrounding a sensor device 106 that are possible and contemplated herein. Example sensor devices 106 include, but are not limited to, a motion sensor (e.g., a gyroscope, a camera, etc.), an image sensor (e.g., a camera, a video recorder, a webcam, a thermal imager, a facial recognition device, a CMOS image sensor, etc.), an audio sensor (e.g., a microphone, etc.), an RFID sensor/tag, a temperature sensor (e.g., a thermometer, thermal sensor, etc.), and/or a biometric sensor (e.g., heartrate monitor, oxygen monitor, blood sugar monitor, respiration monitor, etc.) etc., among other types of sensing devices and/or biometric sensing devices that are possible and contemplated herein.

In some embodiments, each sensor device 106 is configured to generate a sensor signal including sensor data indicating and/or representing a physical input corresponding to its particular type of sensor device 106. In various embodiments, the sensor signal(s) including the sensor data are generated by the sensor device(s) 106 in real-time as the sensor device(s) 106 are detecting, sensing, and/or measuring the physical input(s) indicative of the set of properties and/or conditions of the environment surrounding the sensor device(s) 106. In additional embodiments, each sensor device 106 is configured to transmit the generated sensor signal(s) including the sensor data to a set of one or more memory devices (e.g., memory device(s) 108A and memory device(s) 108B) and/or a processor (e.g., processor 110A and processor 110B), as discussed elsewhere herein.

A set of memory devices 108 may include any suitable quantity of memory devices 108. Further, a memory device 108 may include any suitable type of device and/or system that is known or developed in the future that can store computer-useable code and/or computer-readable code. In various embodiments, a memory device 108 may include one or more non-transitory computer-usable mediums (e.g., readable, writable, readable-writable, etc.), which may include any non-transitory and/or persistent apparatus or device that can contain, store, communicate, propagate, and/or transport applications, instructions, data, computer programs, software, code, routines, etc., for processing by or in connection with a computer processing device (e.g., processor 108A and/or processor 108B).

A memory device 108, in some embodiments, includes volatile computer storage media. For example, a memory device 108 may include random access memory (RAM), including dynamic RAM (DRAM), synchronous dynamic RAM (SDRAM), and/or static RAM (SRAM). In other embodiments, a memory device 108 includes non-volatile computer storage media. For example, a memory device 108 may include flash memory and/or any other suitable non-volatile computer storage device that is known or developed in the future. In various embodiments, a memory device 108 includes both volatile and non-volatile computer storage media.

Figure 2A:
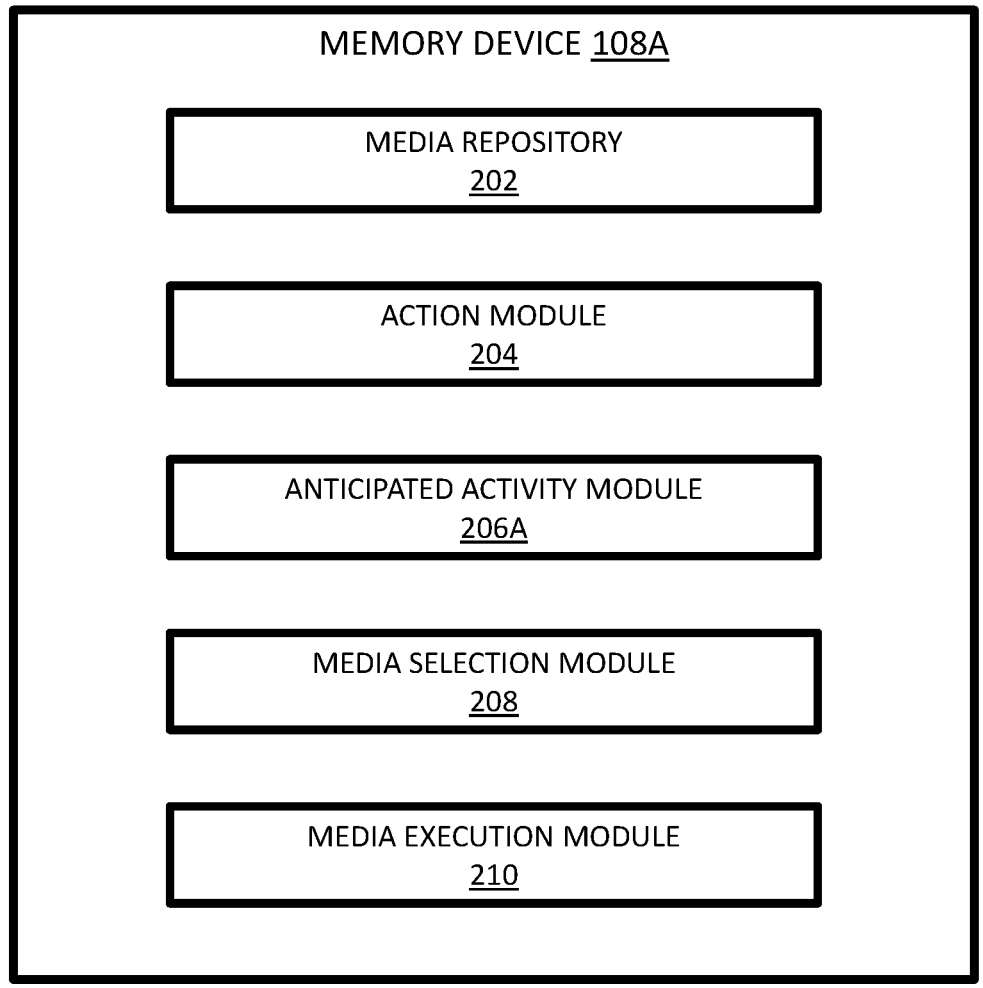
FIGS. 2A through 2D are schematic block diagrams illustrating various embodiments of a memory device included in the computing devices of FIGS. 1A and 1B.

With reference now to FIG. 2A, FIG. 2A is a schematic block diagram of one embodiment of a memory device 108. At least in the illustrated embodiment, the memory device 108 includes, among other components, a media repository 202, an action module 204, an activity module 206A, a media selection module 208, and a media execution module 210 that are each configured to operate/function in conjunction with one another when executed by a processor 108 to play a media selection based on an anticipated activity.

A media repository 202 may include any suitable hardware and/or software capable of storing, organizing, and/or managing a set of visual media and/or a set of audio media that can executed by a processor 108 for play on and/or execution on one or more displays 102 and/or one or more audio output devices 104. A set of visual media may include any suitable quantity of visual media (e.g., one or more visual elements, one or more visual objects, and/or one or more visual files, etc.) and/or a set of audio media may include any suitable quantity of audio media (e.g., one or more audio elements, one or more audio objects, and/or one or more audio files, etc.).

Visual media may include any suitable element(s), object(s), and/or file(s), etc. that is/are known or developed in the future capable of being played/displayed and/or executed on one or more displays 102. As such, a set of visual media can include one or more visual elements, one or more visual objects, and/or one or more visual files, etc., among other visual media that are possible and contemplated herein. In certain embodiments, visual media can include, for example, an application that includes one or more visual components and/or visual features, a digital picture/photo, a digital video, a podcast, a digital movie, a digital presentation (live and/or recorded), a video conference (live and/or recorded) and/or a sporting event (live and/or recorded), etc., among other visual media that can be played/displayed on one or more displays 102 that are possible and contemplated herein.

In various embodiments, a set of visual media can be organized, arranged, and/or grouped in general terms, which can include any suitable criteria or criterion that is/are known or developed in the future. In certain embodiments, a set of visual media can be organized, arranged, and/or grouped by a visual media type (e.g., application, video, picture/photo, movie, video stream, live stream, and/or podcast, etc.), among other criteria/criterion that is/are possible and contemplated herein. For example, applications can form a first group, videos form a second group, pictures/photos form a third group, movies form a fourth group, video streams form a fifth group, live streams form a sixth group, and podcasts form a seventh group, etc., among other groups and/or quantities of groups that are possible and contemplated herein.

In additional or alternative embodiments, a set of visual media and/or a group of visual media can be specifically organized, arranged, and/or grouped. For example, in certain embodiments, two or more digital media (e.g., visual media, visual files, and/or visual media files, etc.) can be organized, arranged, and/or grouped together in a playlist that is stored in the media repository 202. The criteria and/or criterion forming the basis for organizing, arranging, and/or grouping a set of visual media in a playlist and/or further organizing, arranging, and/or grouping a group of visual media in a playlist can include any suitable criteria or criterion that is known or developed in the future. For example, a playlist can be based on a category, genre, date and/or range(s) of date(s) of creation and/or performance, performer, presenter, class, style, originator, creator, owner, and/or source, etc., and combinations therein and/or thereof, among other criteria/criterion capable of organizing, arranging, and/or grouping visual media in a playlist.

In some embodiments, a playlist of visual media can be created on the computing device 100 and/or downloaded to the computing device 100 by one or more users of the computing device 100 for storage in the media repository 202. In additional or alternative embodiments, a visual media playlist can be automatically and/or automatedly created, assigned, and/or downloaded by the computing device 100 (e.g., processor 108A, 108B, etc.) for storage in the media repository 202.

In further embodiments, the media repository 202 is configured to store multiple playlists of visual media (e.g., two or more visual media playlists). In other words, a set of visual media playlists can be created on the computing device 100 and/or downloaded to the computing device 100 by one or more users of the computing device 100 and/or a set of visual media playlists can be automatically and/or automatedly created, assigned, and/or downloaded by the computing device 100 for storage in the media repository 202. In certain embodiments, the multiple playlists of visual media can be organized, arranged, and/or grouped by type, genre, category, date and/or range(s) of date(s) of creation and/or performance, performer, presenter, class, style, originator, creator, owner, and/or source, etc., and combinations therein and/or thereof, among other criteria/criterion capable of organizing, arranging, and/or grouping playlists of visual media. For example, multiple playlists of movies can be based on genre and/or actor(s) and multiple playlists of video presentations can be based on presenter(s) and/or dates, among other criteria and/or criterion that are possible and contemplated herein.

Audio media may include any suitable element(s), object(s), and/or file(s), etc. that is/are known or developed in the future capable of being played and/or executed on one or more audio output devices 104. As such, a set of audio media can include one or more audio elements, one or more audio objects, and/or one or more audio files, etc., among other audio media that are possible and contemplated herein. In certain embodiments, audio media can include, for example, music, sounds, ringtones, audio content of a video, audio content of a podcast, audio content of a digital movie, audio content of a digital presentation (live and/or recorded), audio content of a video conference (live and/or recorded), audio content of a sporting event (live and/or recorded), and/or an application that includes one or more audio components and/or audio features, etc., among other audio media that can be played on one or more audio output devices 104 that are possible and contemplated herein.

In various embodiments, a set of audio media can be organized, arranged, and/or grouped in general terms, which can include any suitable criteria or criterion that is/are known or developed in the future. In certain embodiments, a set of audio media can be organized, arranged, and/or grouped by an audio media type (e.g., application, video, music, sound, movie, video stream, live stream, and/or podcast, etc.), among other criteria/criterion that is/are possible and contemplated herein. For example, applications can form a first group, music form a second group, videos form a third group, sounds form a fourth group, movies form a fifth group, video streams form a sixth group, live streams form a seventh group, podcasts form an eighth group, and ringtones form an ninth group, etc., among other groups and/or quantities of groups that are possible and contemplated herein.

In additional or alternative embodiments, a set of audio media and/or a group of audio media can be specifically organized, arranged, and/or grouped. For example, in certain embodiments, two or more digital media (e.g., audio media, audio files, and/or audio media files, etc.) can be organized, arranged, and/or grouped together in a playlist that is stored in the media repository 202. The criteria and/or criterion forming the basis for organizing, arranging, and/or grouping a set of audio media in a playlist and/or further organizing, arranging, and/or grouping a group of audio media in a playlist can include any suitable criteria or criterion that is known or developed in the future. For example, a playlist can be based on a category, genre, date and/or range(s) of date(s) of creation and/or performance, performer, presenter, class, style, originator, creator, owner, and/or source, etc., and combinations therein and/or thereof, among other criteria/criterion capable of organizing, arranging, and/or grouping audio media in a playlist.

In some embodiments, a playlist of audio media can be created on the computing device 100 and/or downloaded to the computing device 100 by one or more users of the computing device 100 for storage in the media repository 202. In additional or alternative embodiments, an audio media playlist can be automatically and/or automatedly created, assigned, and/or downloaded by the computing device 100 (e.g., processor 108A and processor 108B, etc.) for storage in the media repository 202.

In further embodiments, the media repository 202 is configured to store multiple playlists of audio media (e.g., two or more audio media playlists). In other words, a set of audio media playlists can be created on the computing device 100 and/or downloaded to the computing device 100 by one or more users of the computing device 100 and/or a set of visual media playlists can be automatically and/or automatedly created, assigned, and/or downloaded by the computing device 100 for storage in the media repository 202. In certain embodiments, the multiple playlists of audio media can be organized, arranged, and/or grouped by type, genre, category, date and/or range(s) of date(s) of creation and/or performance, performer, presenter, class, style, originator, creator, owner, and/or source, etc., and combinations therein and/or thereof, among other criteria/criterion capable of organizing, arranging, and/or grouping playlists of audio media. For example, multiple playlists of songs can be based on genre and/or band/singer and multiple playlists of sounds can be based on the type of sound (e.g., nature sounds, white noises, etc.), among other criteria and/or criterion that are possible and contemplated herein.

An action module 204 may include any suitable hardware and/or software that can determine one or more current actions and/or a current activity being performed by the user of a computing device 100. The current action(s) and/or a current activity being performed by the user capable of being determined and/or identified by an action module 204 may include any suitable action(s) and/or activity that is/are known or discovered in the future capable of being performed by the user of a computing device 100.

In various embodiments, the action module 204 includes an action repository of actions capable of being performed by a user (e.g., a human). The actions capable of being performed by the user may include any known or discovered action that can be performed by a body part and/or the coordination of body parts of a user (e.g., head, eye(s), nose, ear(s), mouth, neck, arm(s), elbow(s), hand(s), finger(s), torso, leg(s), knee(s), foot/feet, toe(s), etc.) singularly and/or with respect to one or more external objects. The action(s) may include one or more static actions, one or more dynamic actions, and/or one or more actions performed over time (e.g., one or more static actions performed over time and/or one or more dynamic actions performed over time).

In additional or alternative embodiments, the action module 204 includes an activity repository of activities capable of being performed by a user. The activity/activities capable of being performed by the user may include any known or discovered activity that can be performed by a body part and/or the coordination of body parts of a user (e.g., head, eye(s), nose, ear(s), mouth, neck, arm(s), elbow(s), hand(s), finger(s), torso, leg(s), knee(s), foot/feet, toe(s), etc.) singularly and/or with respect to one or more external objects. The activities may include one or more static activities, one or more dynamic activities, and/or one or more activities performed over time (e.g., one or more static activities performed over time and/or one or more dynamic activities performed over time).

In various embodiments, the action module 204 is configured to receive the sensor data generated by the sensor device(s) 106 and determine the user's current action(s) and/or the current activity being performed by the user based on the sensor data received from the sensor device(s) 106. In some embodiments, the action module 204 is configured to determine the user's current action(s) based on a nexus of the detected, sensed, and/or measured physical inputs of the sensor device(s) 106 indicative of a set of properties and/or conditions of an environment surrounding the sensor device(s) 106 and the action(s) included in the action repository. In a non-limiting example, the action module 204 may determine that the user of a computing device 100 is motionless or minimally moving in response to sensor data received from the sensor device(s) 106 including image data (e.g., one or more images, video, etc.) of the user on a bed, chair, or couch and/or motion data (e.g., speed, angular motion, light, etc.) indicating that the user and/or computing device 100 is in a static position and/or is currently not moving much, etc., among other actions and/or sensor data that is/are possible and contemplated herein.

In additional or alternative embodiments, the action module 204 is configured to receive the sensor data generated by the sensor device(s) 106 and determine the current activity being performed by the user based on the sensor data received from the sensor device(s) 106. In some embodiments, the action module 204 is configured to determine the user's current activity based on a nexus of the detected, sensed, and/or measured physical inputs of the sensor device(s) 106 indicative of a set of properties and/or conditions of an environment surrounding the sensor device(s) 106 and the activity/activities included in the activity repository.

In one non-limiting example, the action module 204 may determine that the user of a computing device 100 is in motion in response to sensor data received from the sensor device(s) 106 including image data (e.g., one or more images, video, etc.) of the user and a motor vehicle and/or motion data (e.g., speed, angular motion, light, etc.) indicating that the user and/or computing device 100 is moving at a rate of speed greater than a predetermined threshold speed (e.g., the maximum running speed of a human), etc., among other activities and/or sensor data that is/are possible and contemplated herein. In another non-limiting example, the action module 204 may determine that the user of a computing device 100 is engaged in a physical activity (e.g., walking, running, riding a bicycle, exercising, playing a game/sport, etc.) in response to sensor data received from the sensor device(s) 106 including thermal data indicating that the user's body temperature is higher than normal (e.g., greater than 37° C. or greater than 98.6° F.) and/or biometric data indicating that the user's heartrate is at an elevated level, etc., among other activities and/or sensor data that is/are possible and contemplated herein. In yet another non-limiting example, the action module 204 may determine that the user of a computing device 100 is preparing for a solemn event in response to sensor data received from the sensor device(s) 106 including image data (e.g., one or more images, video, etc.) of the user's face showing a sad countenance (e.g., tears, unhappy facial expression(s,) etc.) and/or audio data indicating that the user is using reverent language (e.g., crying sounds, a quite tone, respectful words, etc.), etc., among other activities and/or sensor data that is/are possible and contemplated herein.

In various embodiments, the action module 204 is configured to determine the action(s) and/or activity that the user is currently performing in response to receiving one or more commands (e.g., an audio command (e.g., a voice command, etc.), a visual command (e.g., a gesture, etc.), and/or a tactile command (e.g., a touch input) from a user. Further, the action module 204 is configured to transmit a notification to an anticipated activity module 206A in which the notification identifies the action(s) and/or activity that the user of the computing device 100 is currently performing. In addition, the anticipated activity module 206A is configured to receive the notification from the action module 204.

An anticipated activity module 206A may include any suitable hardware and/or software that can determine and/or identify one or more activities and/or one or more events that will occur in the future, that may occur in the future, and/or that include a relatively high probability of occurring in the future. An activity and/or an event that will occur in the future, that may occur in the future, and/or that includes a relatively high probability of occurring in the future can be referred to herein as, an anticipated activity, an anticipated event, an expected activity, and/or an expected event.

While the terms, anticipated and expected, include different meanings/definitions, different connotations, slightly different meanings/definitions, and/or slightly different connotations, as discussed herein, the terms, anticipated and expected, may be used interchangeably and/or their respective use can include the meaning(s)/definition(s) and/or connotation(s) of the other term. That is, use of and/or reference to the term, anticipated, includes the meaning(s)/definition(s) and connotation(s) of the term, anticipated, and may further include the meaning(s)/definition(s) and/or connotation(s) of term, expected. Similarly, use of and/or reference to the term, expected, includes the meaning(s)/definition(s) and connotation(s) of the term, expected, and may also include the meaning(s)/definition(s) and/or connotation(s) of term, anticipated. As such, reference to an anticipated activity module 206A can also refer to and/or include an expected activity module 206A.

Further, while the terms, activity and event, include different meanings/definitions, different connotations, slightly different meanings/definitions, and/or slightly different connotations, as discussed herein, the terms, activity and event, may be used interchangeably and/or their respective use can include the meaning(s)/definition(s) and/or connotation(s) of the other term. That is, use of and/or reference to the term, activity, includes the meaning(s)/definition(s) and connotation(s) of the term, activity, and may also include the meaning(s)/definition(s) and/or connotation(s) of term, event. Similarly, use of and/or reference to the term, event, includes the meaning(s)/definition(s) and connotation(s) of the term, event, and may also include the meaning(s)/definition(s) and/or connotation(s) of term, activity. As such, reference to an anticipated activity module 206A can also refer to and/or include an anticipated event module 206A and/or an expected event module 206A. Similarly, reference to an anticipated event module 206A and/or an expected event module 206A can also refer to and/or include an expected activity module 206A, as discussed above.

An anticipated activity module 206A is configured to determine an anticipated activity for the user of a computing device 100 based on a data included in a notification received from an action module 204. That is, the anticipated activity module 206A is configured to determine an anticipated activity for the user of the computing device 100 based on the action(s) and/or activity that the user is currently performing, as determined and/or identified by the action module 204.

An anticipated activity (anticipated event, expected activity, and/or expected event) may include any suitable activity and/or event that is known or discovered in the future that a user of a computing device 100 is capable of participating in and/or performing. Further, an anticipated activity/event and/or expected activity/event may include any suitable activity and/or event that will occur in the future, that may occur in the future, and/or that include(s) a relatively high probability of occurring in the future. In a non-limiting example, an anticipated activity/event and/or expected activity/event can include about a seventy-five percent (75%) probability and/or chance of occurring in the future, among other probabilities and/or chances of occurring that are less than about 75% or greater than about 75% that are possible and contemplated herein.

In various embodiments, an anticipated activity module 206A is configured to determine anticipated activities based on a nexus between an activity and/or an event that will occur in the future, that may occur in the future, and/or that include(s) a relatively high probability of occurring in the future corresponding to current action(s) and/or current activity/activities. That is, an anticipated activity module 206A is configured to determine an anticipated activity for a user of a computing device 100 based on a nexus between the current actions(s) and/or current activity of the user and an activity and/or an event that the user will perform in the future, may perform in the future, and/or that include(s) a relatively high probability that the user will perform in the future corresponding to the action(s) and/or activity currently being performed by the user.

In various embodiments, the anticipated activity module 206A is configured to determine and/or calculate a confidence level for an anticipated activity. The determined and/or calculated confidence level, in various embodiments, may be based on the nexus between the user's current action(s) and/or current activity and an activity that the user will perform in the future, may perform in the future, and/or includes a relatively high probability that the user will perform in the future corresponding to the user's current action(s) and/or current activity.

The confidence level can be determined and/or calculated using any suitable method, algorithm, and/or technique that is known or developed in the future. Further, the confidence level can include any suitable metric and/or threshold that is known or developed in the future.

In some embodiments, the metric and/or threshold defining a confidence level is set and/or defined by the user. In additional or alternative embodiments, the metric and/or threshold defining a confidence level is set and/or learned via machine learning, which can include any suitable machine learning method, algorithm, and/or technique that is known or developed in the future.

The anticipated activity module 206A, in various embodiments, is configured to determine an anticipated activity in response to the confidence level being greater than or equal to a threshold amount, value, and/or level. Further, the anticipated activity module 206A is configured to determine that an activity is not an anticipated activity in response to the confidence level being less than the threshold amount, value, and/or level.

In continuing the non-limiting example set forth above in which the action module 204 determined that the user's current action(s) include the user lying motionless or minimally moving on a bed, the anticipated activity module 206A may determine that an anticipated activity for the user includes the user waking up. Here, the anticipated activity module 206A may determine that the anticipated activity includes the user waking up because the user's current actions are indicative of the user currently being asleep and the user waking up is an activity that the user will perform in the future, may perform in the future, and/or includes a relatively high probability that the user will perform in the future.

Continuing the above non-limiting example in which the action module 204 determined that the user's current action(s) include the user being in motion responsive to images of the user and a motor vehicle and/or motion data indicating that the user and/or computing device 100 is moving at a rate of speed greater than a predetermined threshold speed, the anticipated activity module 206A may determine that an anticipated activity for the user includes the user arriving at a particular/predetermined destination and/or participating in an activity at a particular/predetermined time because the user is currently driving a vehicle. Further, in the non-limiting example in which the action module 204 determines that the user is engaged in a physical activity responsive to sensor data indicating that the user's body temperature is higher than normal and/or that the user's heartrate is at an elevated level, the anticipated activity module 206A may determine that an anticipated activity for the user includes the user performing a grooming activity since the physical activity is indicative of the user exercising and user typically grooms after exercising. In addition, in the non-limiting example in which the action module 204 determines that the user is preparing for a solemn event responsive to sensor data showing the user's face with a sad countenance and/or the user is using reverent language, the anticipated event module 206A may determine that the anticipated event is a funeral.

In various embodiments, the anticipated event module 206A is configured to determine an anticipated activity in response to receiving a notice identifying the user's current action(s) and/or current activity received from an action module 204. Further, the anticipated event module 206A is configured to transmit a notification that identifies an anticipated activity to a media selection module 208 in response to determining the anticipated activity. In addition, the media selection module 208 is configured to receive the notification from the anticipated activity module 206A.

A media selection module 208 may include any suitable hardware and/or software that can select visual media and/or audio media for execution on one or more displays 102 and/or one or more audio output devices 104. In various embodiments, the media selection module 208 is configured to select visual media and/or audio media for execution on one or more displays 102 and/or one or more audio output devices 104 based on an anticipated activity. Visual media and/or audio media may be selected for execution on one or more displays 102 and/or one or more audio output devices 104 based on any suitable criteria or criterion that is known or developed in the future.

In certain embodiments, the user selects which type of media to play for which type(s) of anticipated activity and/or which anticipated activity/activities. For example, a user may select audio media for exercising (e.g., an anticipated type of activity) and/or for jogging (e.g., a specific anticipated activity), among other media, types of anticipated activities, and/or specific anticipated activities that are possible and contemplated herein.

In other embodiments, the media selection module 208 automatically and/or automatedly selects which type of media to play for which type(s) of anticipated activity and/or which anticipated activity/activities. In still other embodiments, the user selects which type of media to play for at least one type of anticipated activity and/or at least one anticipated activity and the media selection module 208 automatically and/or automatedly selects which type of media to play for at least one type of anticipated activity and/or at least one anticipated activity.

In one non-limiting example, the user may select audio media and/or music for one or more anticipated activities that include driving a vehicle, among other media and/or anticipated activities that are possible and contemplated herein. In an additional or alternative non-limiting example, the media selection module 208 may select visual media and/or videos for one or more anticipated activities that include sitting on a couch, among other media and/or anticipated activities that are possible and contemplated herein.

In additional or alternative embodiments, the media selection module 208 is configured to select a visual media playlist and/or audio media playlist for execution on one or more displays 102 and/or one or more audio output devices 104 based on an anticipated activity. A visual media playlist and/or an audio media playlist may be selected for execution on one or more displays 102 and/or one or more audio output devices 104 based on any suitable criteria or criterion that is known or developed in the future.

In certain embodiments, the user selects which type(s) of media playlist and/or media playlist for which type(s) of anticipated activity and/or which anticipated activity/activities. In other embodiments, the media selection module 208 automatically and/or automatedly selects which type(s) of media playlist and/or media playlist for which type(s) of anticipated activity and/or which anticipated activity/activities. In still other embodiments, the user selects one or more types of media playlist and/or one or more media playlists to play for which type(s) of anticipated activity and/or which anticipated activity/activities and the media selection module 208 automatically and/or automatedly selects one or more types of media playlist and/or one or more media playlists to play for which type(s) of anticipated activity and/or which anticipated activity/activities.

In various non-limiting examples, the user may select a music playlist (e.g., a genre of music, a particular artist/group, and user-generated playlist of song, etc.) for one or more anticipated activities and/or a movie playlist (e.g., a genre of movies, a particular entertainer, and user-generated playlist of movies, etc.) for one or more other anticipated activities, among other playlists and/or anticipated activities that are possible and contemplated herein. In an additional or alternative non-limiting example, the media selection module 208 may automatically and/or automatedly select a music playlist (e.g., a genre of music, a particular artist/group, and user-generated playlist of song, etc.) for one or more anticipated activities and/or a movie playlist (e.g., a genre of movies, a particular entertainer, and user-generated playlist of movies, etc.) for one or more other anticipated activities, among other playlists and/or anticipated activities that are possible and contemplated herein.

In some embodiments, the media selection module 208 is configured to automatically and/or automatedly select a type of media and/or a particular audio/visual media for an anticipated activity. Here, the type of media and/or the particular audio/visual media may be randomly selected and/or selected on-the-fly by the media selection module 208.

In various embodiments, the media selection module 208 is configured to perform a media selection in response to receiving a notification identifying an anticipated event from the anticipated event module 206A. Further, the media selection module 208 is configured to transmit its media selection to the media execution module 210 in response to making a media selection. The media execution module 210 is configured to receive the media selection from the media selection module 208.

A media execution module 210 may include any suitable hardware and/or software that can execute and/or facilitate execution of visual media and/or audio media on one or more displays 102 and/or one or more audio output devices 104. In various embodiments, the media execution module 210 is configured to execute and/or facilitate execution of a media selection (e.g., a selected visual media or a selected audio media) on the display(s) 102 and/or audio output device(s) 104 in response to receiving the media selection from the media selection module 208.

A selected visual media can include a one or more visual media, visual files, visual media files, and/or visual playlists. As such, the media execution module 210, in some embodiments, is configured to execute and/or facilitate execution of one or more visual media, visual files, visual media files, and/or visual playlists on the display(s) 102 and/or audio output device(s) 104 in response to receiving a media selection received from the media selection module 208 identifying the one or more visual media, visual files, visual media files, and/or visual playlists.

Similarly, a selected audio media can include a one or more audio media, audio files, audio media files, and/or audio playlists. As such, the media execution module 210, in additional or alternative embodiments, is configured to execute and/or facilitate execution of one or more audio media, audio files, audio media files, and/or audio playlists on the audio output device(s) 104 in response to receiving a media selection received from the media selection module 208 identifying the one or more audio media, audio files, audio media files, and/or audio playlists.

Figure 2B:
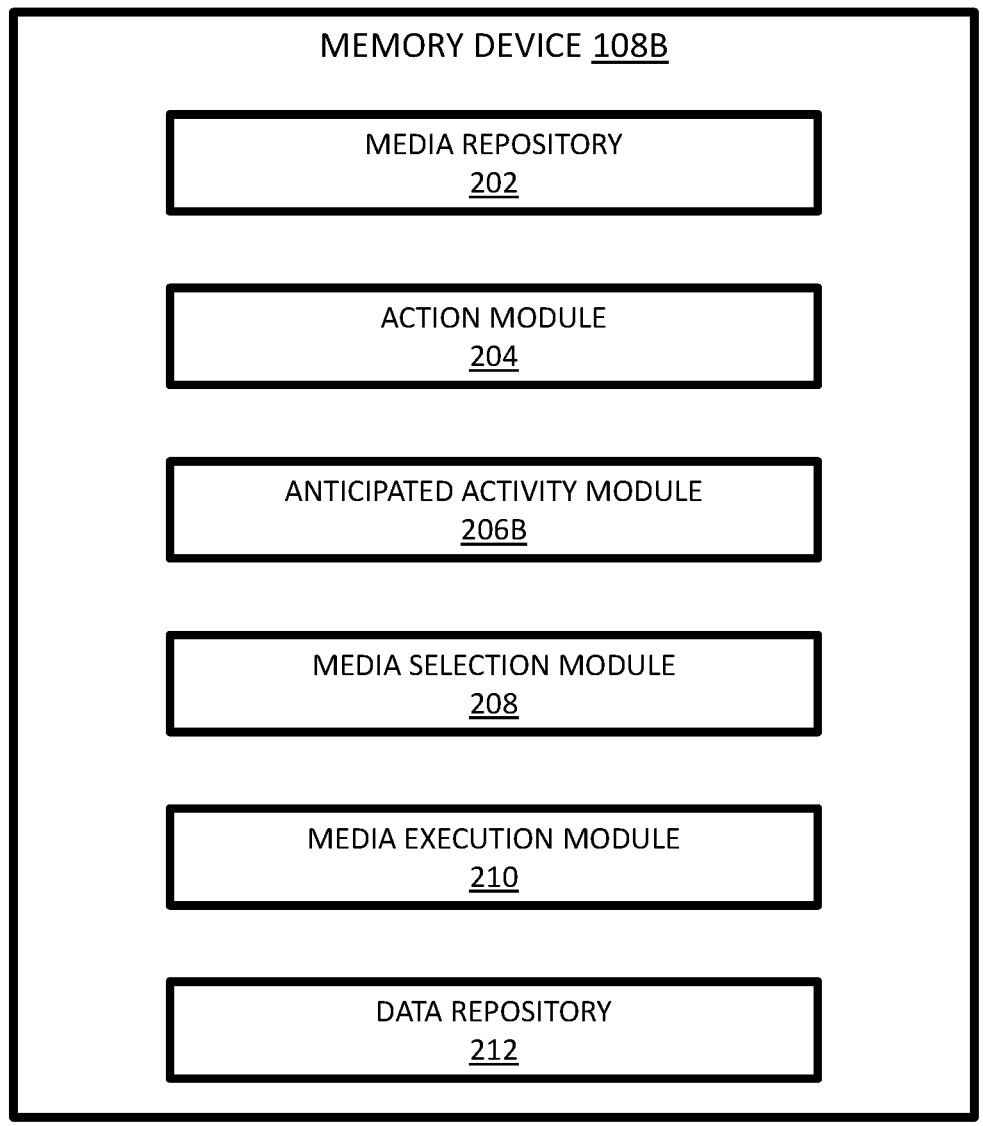

With reference to FIG. 2B, FIG. 2B is a block diagram of another embodiment of a memory device 108B. The memory device 108B includes a media repository 202, an action module 204, an anticipated activity module 206B, a media selection module 208, and a media execution module 210 similar to the media repository 202, action module 204, anticipated activity module 206A, media selection module 208, and media execution module 210 included in the memory device 108A discussed with reference to FIG. 2A. At least in the embodiment illustrated in FIG. 2B, the memory device 108B further includes, among other components and/or features, a data repository 212.

A data repository 212 may include any suitable hardware and/or software that can store data. As such, the data repository 212 may include any suitable type of data repository and/or data repository that is known or developed in the future.

In various embodiments, the data repository 212 is configured to store activity data for the user. In some embodiments, the activity data includes a schedule for the user, which can include a set of planned and/or future activities and/or events for the user.

In certain embodiments, the data repository 212 includes a calendar, among other data repositories and/or databases that are possible and contemplated herein capable of storing a set of planned, future, and/or scheduled activities and/or events for the user. Here, the calendar can include the schedule of and/or a listing of one or more activities and/or events that the user has scheduled and/or planned for performing in the future. That is, the calendar can include the date(s) and/or time(s) of one or more activities and/or events that the user has scheduled and/or planned for performing in the future.

The anticipated activity module 206B, in some embodiments, is configured to include all of the operations and/or functions included in the anticipated activity module 206A discussed above with reference to the memory device 108A. In additional or alternative embodiments, the anticipated activity module 206B is configured to determine an anticipated activity based on a nexus between the current action(s) and/or current activity of the user identified/determined by the action module 204 and the activity data for the user stored in the data repository 212.

Similar to one or more non-limiting examples discussed above in which the action module 204 determined that the user's current action(s) include driving a motor vehicle (e.g., there are images of the user and a motor vehicle and the user and/or computing device 100 is moving at a rate of speed greater than the predetermined threshold speed), the anticipated activity module 206B may determine that an anticipated activity for the user includes participating in basketball practice because the data repository 212 lists basketball practice as an activity/event scheduled for the user in the near future and/or relative near future. Here, the notification transmitted by the anticipated activity module 206B to the media selection module 208 can identify basketball practice as the anticipated activity and the media selection module 208 can perform a media selection based on the anticipated activity of basketball practice.

Similar to one or more other non-limiting examples discussed above in which the action module 204 determined that the user's current action(s) include preparing for a solemn event (e.g., there are images of tears on the user's face, unhappy facial expressions, sad countenance, etc. and reverent language, quiet/hushed tones, crying sounds, etc.), the anticipated activity module 206B may determine that an anticipated activity for the user includes attending a funeral because the data repository 212 lists funeral as an activity/event scheduled for the user in the near future and/or relative near future. Here, the notification transmitted by the anticipated activity module 206B to the media selection module 208 can identify attending a funeral as the anticipated activity and the media selection module 208 can perform a media selection based on the anticipated activity of attending a funeral.

Figure 2C:
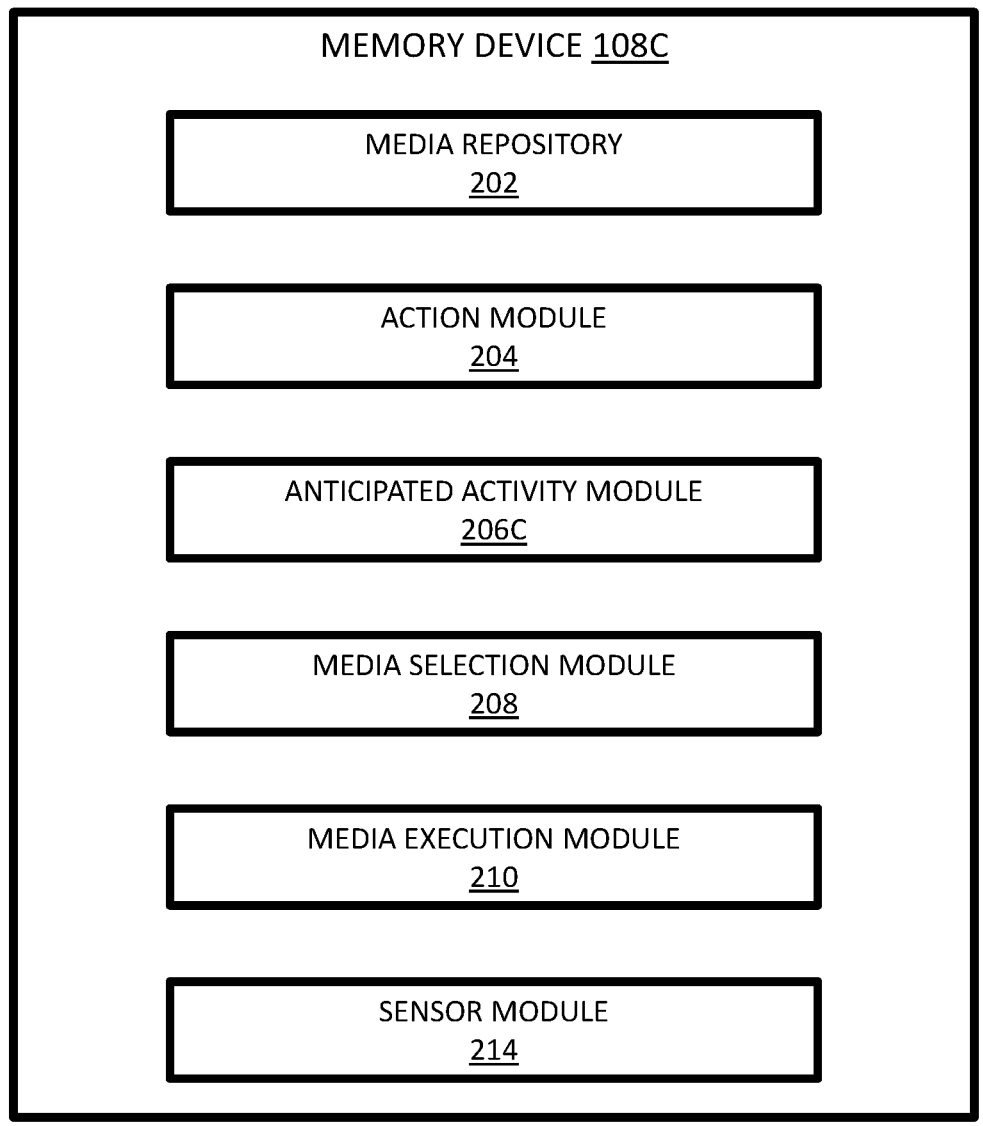

Referring to FIG. 2C, FIG. 2C is a block diagram of another embodiment of a memory device 108C. The memory device 108C includes a media repository 202, an action module 204, an anticipated activity module 206C, a media selection module 208, and a media execution module 210 similar to the media repository 202, action module 204, anticipated activity module 206A, media selection module 208, and media execution module 210 included in the memory device 108A discussed with reference to FIG. 2A. At least in the embodiment illustrated in FIG. 2C, the memory device 108C further includes, among other components and/or features, a sensor module 214. In various embodiments, the sensor module 214 is configured to receive sensor data generated by one or more of the sensor devices 106.

A sensor module 214 may include any suitable hardware and/or software that can utilize the received sensor data to identify one or more objects, one or more physical properties, and/or one or more conditions in the environment surrounding the sensor device(s) 106. The identified one or more objects, one or more physical properties, and/or one or more conditions may include any suitable object(s), physical property/properties, and/or condition(s) that is/are known, developed, and/or discovered in the future that can singularly, collectively, and/or in coordination with other data (see, e.g., anticipated activity module 206D in FIG. 2D) determine an anticipated activity and/or assist in determining an anticipated activity for the user.

The sensor module 214, in some embodiments, can use image data (e.g., video and/or one or more captured images from a camera) to visually identify an object based on one or more characteristics and/or features of the particular object. For example, image data can be used to identify a person via one or more biometric characteristics/features of the person (e.g., via facial recognition, etc.). Similarly, image data can be used to identify the make, model, year, and/or color of a motor vehicle, among other objects that can be identified using image data that are possible and contemplated herein.

In additional or alternative embodiments, the sensor module 214 can use audio data (e.g., one or more sounds) to auditorily identify an object based on one or more characteristics and/or features of the sound(s). For example, audio/voice data can be used to identify a person via, for example, voice recognition. Similarly, audio data can be used to identify a noisy location (e.g., a shipyard, railroad crossing, freeway, clocktower, school, sports complex, etc. among other locations that can be identified using audio data that are possible and contemplated herein.

In further additional or alternative embodiments, the sensor module 214 can use thermal data (e.g., a detected temperature) to identify a season, date, time of day, and/or a particular time. For example, a cold/low temperature can indicate winter and/or nighttime, a cool/warm temperature can indicate spring, autumn/fall, morning, and/or evening, and a hot/high temperature can indicate summer or daytime, etc.), among other temperatures and/or timings that are possible and contemplated herein.

The sensor module 214 is configured to identify the object(s), physical property/properties, and/or condition(s) in the environment surrounding the sensor device(s) 106 in response to receiving the sensor data from the sensor device(s) 106. Further, the sensor module 214 is configured to transmit a notification identifying the object(s), physical property/properties, and/or condition(s) in the environment surrounding the sensor device(s) 106 to the anticipated activity module 206C. The anticipated activity module 206C is configured to receive the notification identifying the object(s), physical property/properties, and/or condition(s) in the environment surrounding the sensor device(s) 106 from the sensor module 214.

The anticipated activity module 206C, in some embodiments, is configured to include all of the operations and/or functions included in the anticipated activity module 206A discussed above with reference to the memory device 108A. In additional or alternative embodiments, the anticipated activity module 206C is configured to determine an anticipated activity based on a nexus between the current action(s) and/or current activity of the user identified/determined by the action module 204 and the identified the object(s), physical property/properties, and/or condition(s) in the environment surrounding the sensor device(s) 106 received from the sensor module 214.

Similar to one or more non-limiting examples discussed above in which the action module 204 determined that the user's current action(s) include driving a motor vehicle (e.g., there are images of the user and a motor vehicle and the user and/or computing device 100 is moving at a rate of speed greater than the predetermined threshold speed), the anticipated activity module 206C may determine that an anticipated activity for the user includes participating in basketball practice because the notification received from the sensor module 214 identifies a teammate of the user (e.g., via image data and/or audio data) and/or a time of day (e.g., via thermal data) in which basketball practice typically begins (e.g., after work/school). Here, the notification transmitted by the anticipated activity module 206C to the media selection module 208 can also identify basketball practice as the anticipated activity and the media selection module 208 can likewise perform a media selection based on the anticipated activity of basketball practice.

Figure 2D:
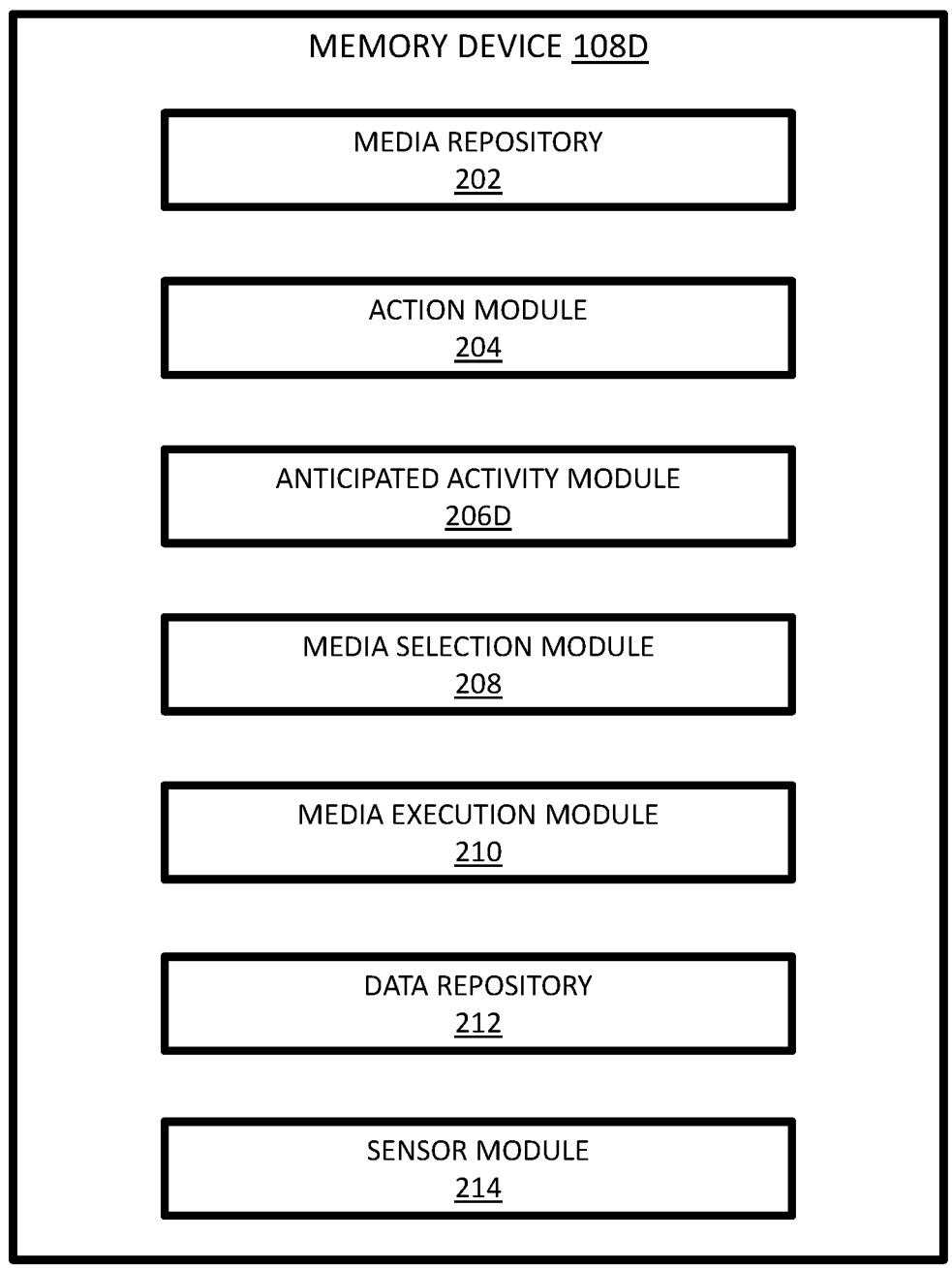

With reference to FIG. 2D, FIG. 2D is a block diagram of yet another embodiment of a memory device 108D. The memory device 108D includes a media repository 202, an action module 204, an anticipated activity module 206C, a media selection module 208, a media execution module 210, a data repository 212, and a sensor module 214 similar to the media repository 202, action module 204, anticipated activity modules 206A/206B/206C, media selection module 208, media execution module 210, data repository 212, and sensor module 214 included in the memory devices 108A, 108B, and 108C discussed with reference to FIGS. 2A, 2B, and 2C, respectively. Here, the anticipated activity module 206D can include the operations and/or functions of anticipated activity module 206A, anticipated activity module 206B, and/or anticipated activity module 206C.

Referring back to FIGS. 1A and 1B, a processor 110 may include any suitable non-volatile/persistent hardware and/or software configured to perform and/or facilitate performing functions and/or operations for playing a media selection based on an anticipated activity. In various embodiments, the processor 110 includes hardware and/or software for executing instructions in one or more modules and/or applications that can perform and/or facilitate performing functions and/or operations for playing a media selection based on an anticipated activity. The modules and/or applications executed by the processor 110 for playing a media selection based on an anticipated activity can be stored on and executed from a memory device 108 (e.g., memory device 108A, memory device 108B, memory device 108C, and memory device 108D) and/or from the processor 110.

Figure 3A:
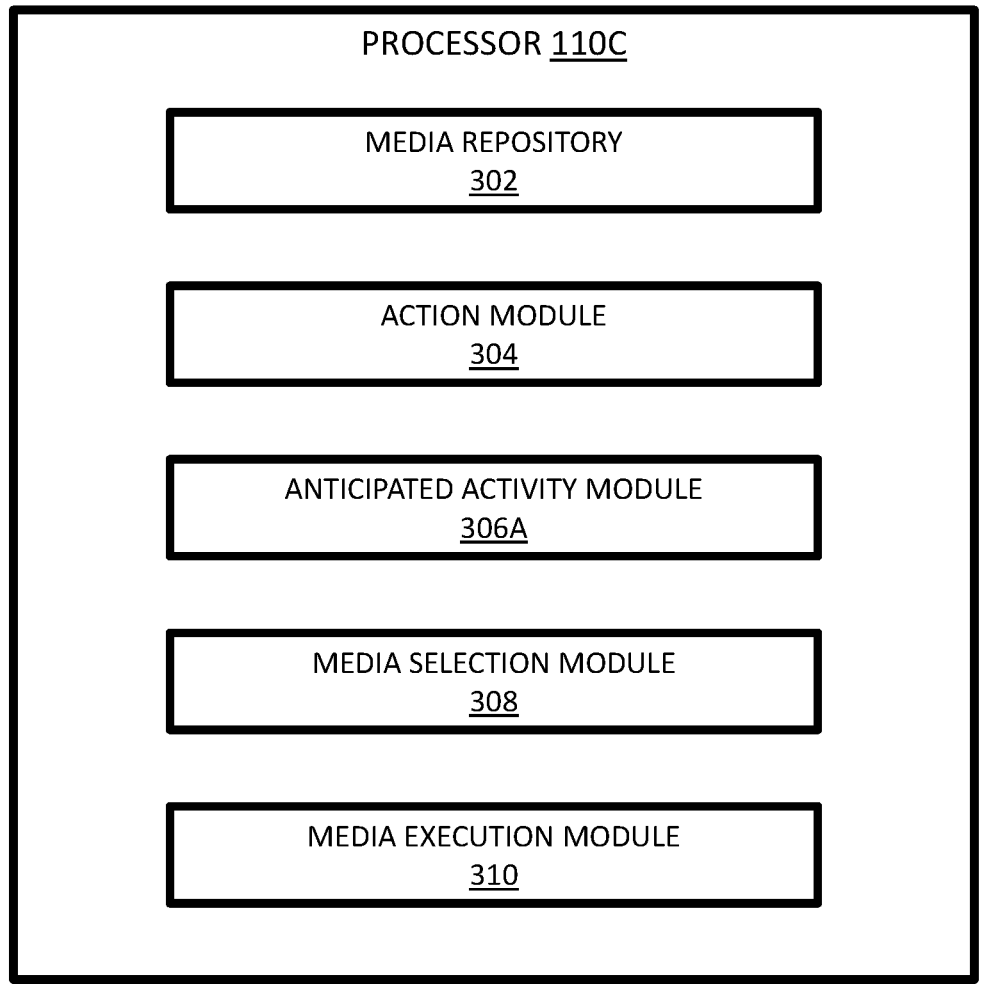
FIGS. 3A through 3D are schematic block diagrams illustrating various embodiments of a processor included in the computing devices of FIGS. 1A and 1B.

With reference to FIG. 3A, FIG. 3A is a schematic block diagram of one embodiment of a processor 110C, which can be one or more embodiments of processor 110A and/or processor 110B. At least in the illustrated embodiment, the processor 110C includes, among other components, a media repository 302, an action module 304, an anticipated activity module 306A, a media selection module 308, and a media execution module 310 similar to the media repository 202, action module 204, anticipated activity module 206A, media selection module 208, and media execution module 210, respectively, in the memory device 108A discussed with reference to FIG. 2A.

Figure 3B:
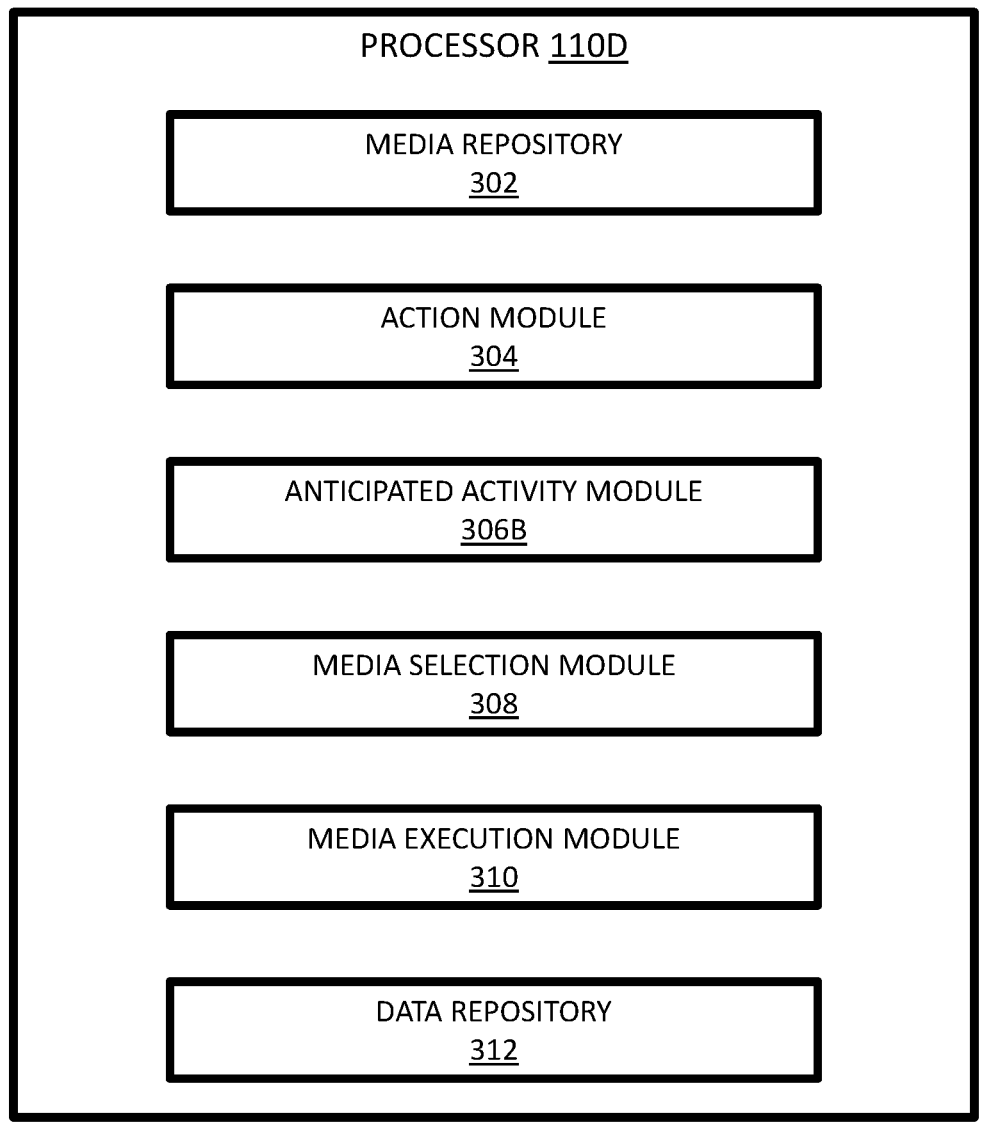

Referring to FIG. 3B, FIG. 3B is a schematic block diagram of another embodiment of a processor 110D, which can be one or more embodiments of processor 110A and/or processor 110B. At least in the illustrated embodiment, the processor 110D includes, among other components, a media repository 302, an action module 304, an anticipated activity module 306B, a media selection module 308, a media execution module 310, and a data repository 312, similar to the media repository 202, action module 204, anticipated activity module 206B, media selection module 208, media execution module 210, and data repository 212, respectively, in the memory device 108B discussed with reference to FIG. 2B.

Figure 3C:
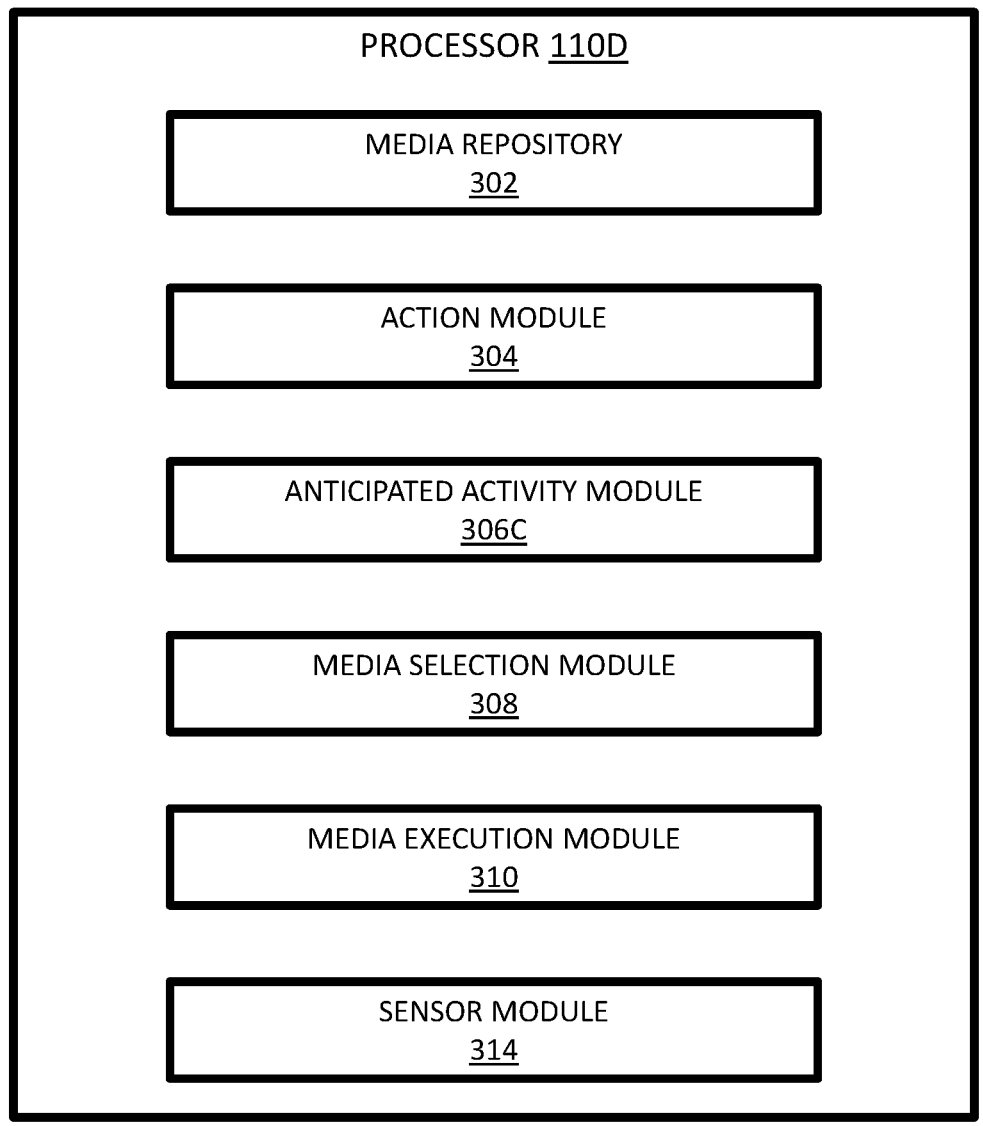

With reference to FIG. 3C, FIG. 3C is a schematic block diagram of yet another embodiment of a processor 110E, which can be one or more embodiments of processor 110A and/or processor 110B. At least in the illustrated embodiment, the processor 110E includes, among other components, a media repository 302, an action module 304, an anticipated activity module 306B, a media selection module 308, a media execution module 310, and a sensor module 314, similar to the media repository 202, action module 204, anticipated activity module 206B, media selection module 208, media execution module 210, and sensor module 214, respectively, in the memory device 108C discussed with reference to FIG. 2C.

Figure 3D:
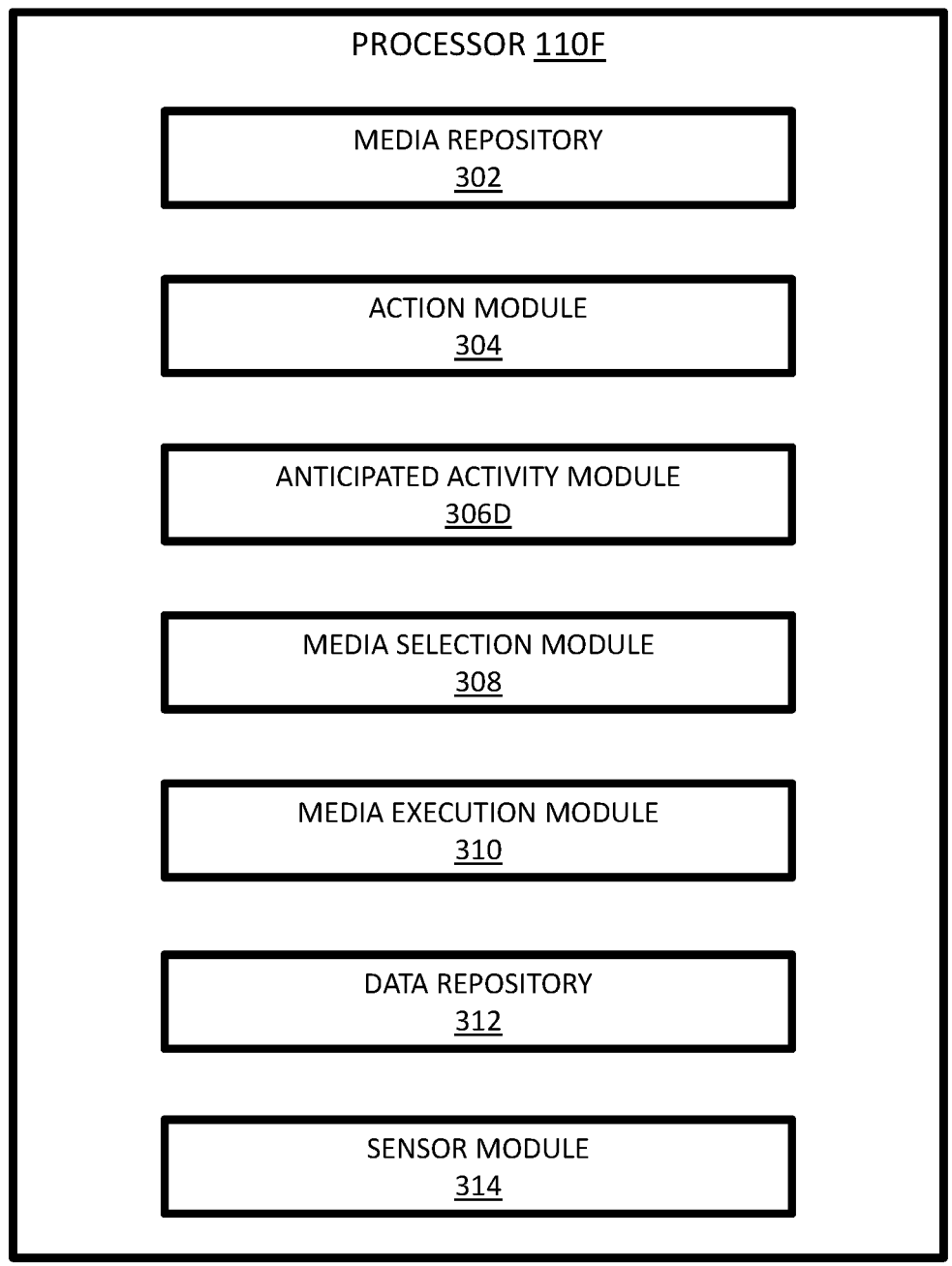

Referring to FIG. 3D, FIG. 3D is a schematic block diagram of still another embodiment of a processor 110F, which can be one or more embodiments of processor 110A and/or processor 110B. At least in the illustrated embodiment, the processor 110F includes, among other components, a media repository 302, an action module 304, an anticipated activity module 306B, a media selection module 308, a media execution module 310, a data repository 312, and a sensor module 314 similar to the media repository 202, action module 204, anticipated activity module 206B, media selection module 208, media execution module 210, data repository 212, and sensor module 214, respectively, in the memory device 108D discussed with reference to FIG. 2D.

Figure 4:
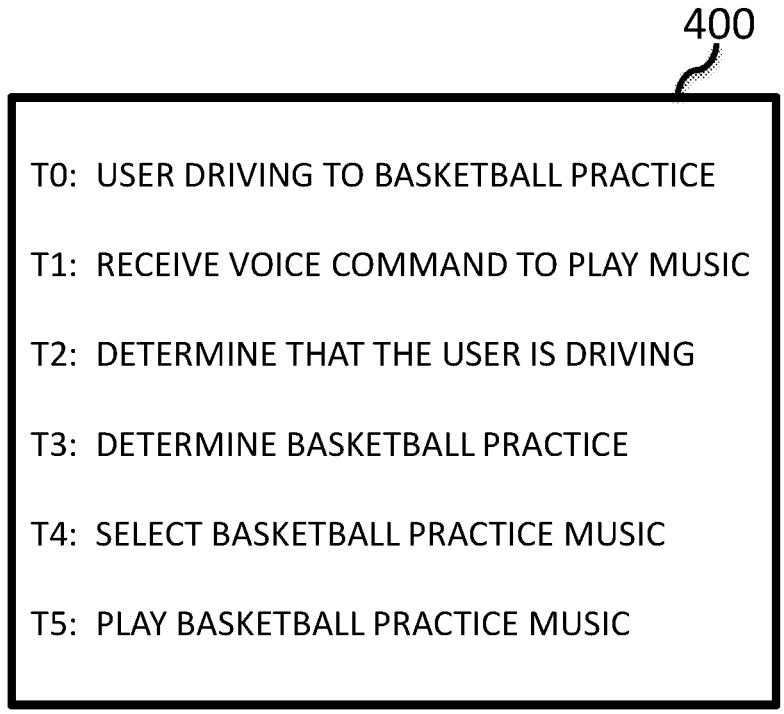
FIG. 4 is schematic diagram illustrating example operations of various embodiments of the computing devices of FIGS. 1A and 1B.
Figure 5:
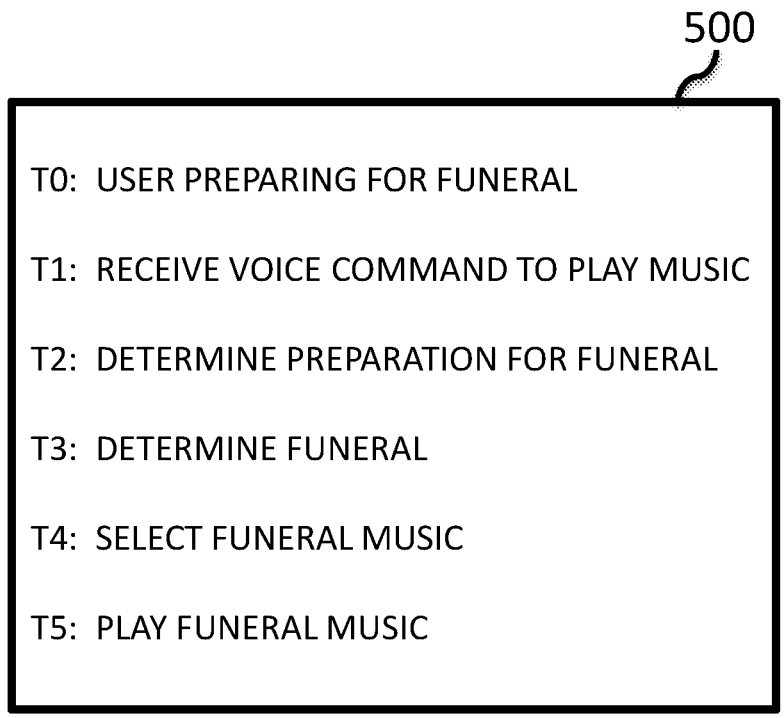
FIG. 5 is schematic diagram illustrating example operations of various other embodiments of the computing devices of FIGS. 1A and 1B.

The non-limiting examples discussed below with reference to FIGS. 4 and 5 are provided so that the spirit and scope of various embodiments may be more easily and/or more readily understood. However, the examples illustrated in FIGS. 4 and 5 are not intended to limit the spirit and/or scope of the various embodiments in any manner.

With reference to FIG. 4, FIG. 4 is a diagram illustrating a non-limiting example of the operations of at least one embodiment of a computing device 100. In the illustrated non-limiting example of FIG. 4, the computing device 100 can include a smartphone or a smartwatch, among other computing devices 100 that are possible and contemplated herein.

In FIG. 4, at time T0, the user is driving to basketball practice. At time T0, the computing device 100 is unaware of the user's current activity and/or future activity/event (e.g., an anticipated activity/event).

At time T1, the computing device 100 receives a voice command from the user. The voice command may include, for example, the user saying, "play some music."

In response to the voice command (e.g., a time T2), the computing device 100 determines the action(s) and/or activity that the user is current performing. Here, the computing device 100 determines that the user is driving a motor vehicle. The computing device 100 may determine the user's current action(s) and/or current activity using any of the various embodiments, operations, and/or functions of a computing device 100 for determining the action(s) and/or activity that the user is current performing discussed elsewhere herein.

At time T3, the computing device 100 determines an anticipated activity for the user based on the determined current action(s) and/or current activity for the user. Here, the anticipated activity is basketball practice. The computing device 100 may determine the anticipated activity using any of the various embodiments, operations, and/or functions of a computing device 100 for determining the anticipated activity discussed elsewhere herein.

The computing device 100, at time T4, make a media selection (e.g., performs a media selection) based on the determined anticipated activity. In this example, the media selection is music that corresponds to, is assigned to, and/or is associated with basketball practice, which can be random music (e.g., autoplay), music pre-selected by the user, music pre-selected by the computing device 100, and/or combinations thereof, which may include a music playlist. The computing device 100 may select the media corresponding to the determined anticipated activity using any of the various embodiments, operations, and/or functions of a computing device 100 for performing a media selection discussed elsewhere herein.

At time T5, the computing device 100 can begin executing the media selection. That is, the computing device 100 can begin playing the music that corresponds to, is assigned to, and/or is associated with basketball practice (e.g., upbeat music, etc.).

With reference to FIG. 5, FIG. 5 is a diagram illustrating another non-limiting example of the operations of at least one embodiment of a computing device 100. In the illustrated non-limiting example of FIG. 4, the computing device 100 can include a laptop computing device or a tablet, among other computing devices 100 that are possible and contemplated herein.

In FIG. 5, at time T0, the user is getting ready to attend a funeral. At time T0, the computing device 100 is unaware of the user's current activity and/or future activity/event (e.g., an anticipated activity/event).

At time T1, the user transmits a voice command to the computing device 100. The voice command may include, for example, the user saying, "play some music, please."

In response to the voice command (e.g., a time T2), the computing device 100 determines the action(s) and/or activity that the user is current performing. Here, the computing device 100 determines that the user is preparing to attend a funeral because the computing device hears some discussion about a funeral and/or a person that has passed. The computing device 100 may determine the user's current action(s) and/or current activity using any of the various embodiments, operations, and/or functions of a computing device 100 for determining the action(s) and/or activity that the user is current performing discussed elsewhere herein.

At time T3, the computing device 100 determines an anticipated activity for the user based on the determined current action(s) and/or current activity for the user. Here, the anticipated activity is a funeral. The computing device 100 may determine the anticipated activity using any of the various embodiments, operations, and/or functions of a computing device 100 for determining the anticipated activity discussed elsewhere herein.

The computing device 100, at time T4, make a media selection (e.g., performs a media selection) based on the determined anticipated activity. In this example, the media selection is music that corresponds to, is assigned to, and/or is associated with a funeral, which can be random music (e.g., autoplay), music pre-selected by the user, music pre-selected by the computing device 100, and/or combinations thereof, which may include a music playlist. The computing device 100 may select the media corresponding to the determined anticipated activity using any of the various embodiments, operations, and/or functions of a computing device 100 for performing a media selection discussed elsewhere herein.

At time T5, the computing device 100 can begin executing the media selection. That is, the computing device 100 can begin playing the music that corresponds to, is assigned to, and/or is associated with a funeral (e.g., reverent music, spiritual music, religious music, etc.).

Figure 6:
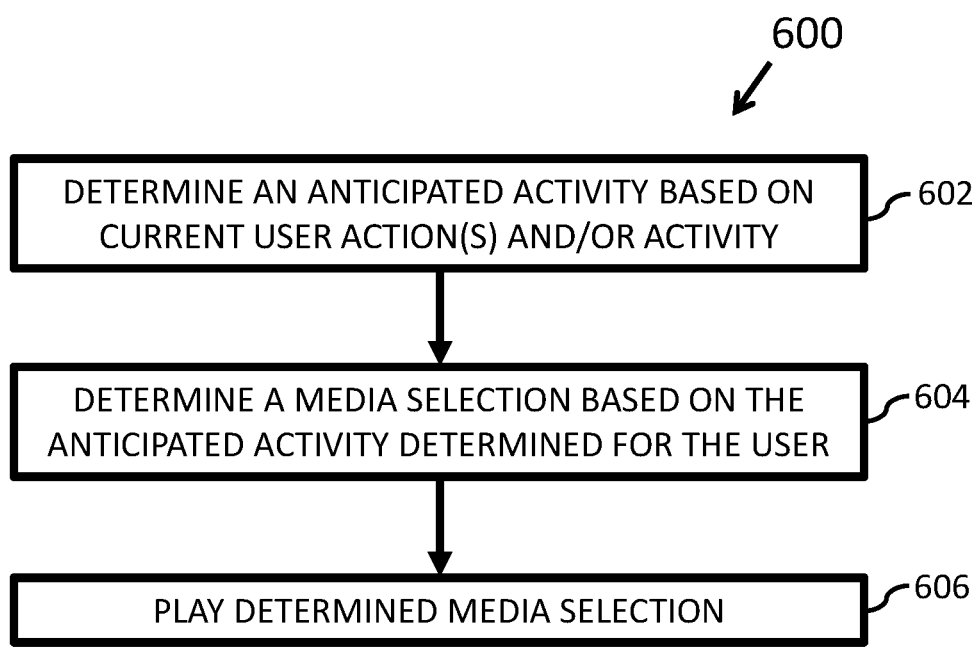
FIG. 6 is a schematic flow chart diagram illustrating one embodiment of a method for playing a media selection based on an anticipated activity.

FIG. 6 is a schematic flow chart diagram illustrating one embodiment of a method 600 for playing a media selection based on an anticipated activity. At least in the illustrated embodiment, the method 600 begins by a processor (e.g., processor 110) determining an anticipated activity for a user based on one or more actions being currently performed by the user (block 602). The processor 110 may determine the anticipated activity using any of the various embodiments, operations, and/or functions of a processor 110 for determining the anticipated activity discussed elsewhere herein.

In some embodiments, the method 600 further includes the processor 110 determining a media selection for the user based on the determined anticipated activity (block 604). The processor 110 may select the media corresponding to the determined anticipated activity using any of the various embodiments, operations, and/or functions of a computing device 100 for performing a media selection discussed elsewhere herein.

The processor 110 can then play and/or execute the selected media (block 606). The selected media can be played on one or more displays 102 and/or one or more audio output devices 104, as discussed elsewhere herein.

Figure 7:
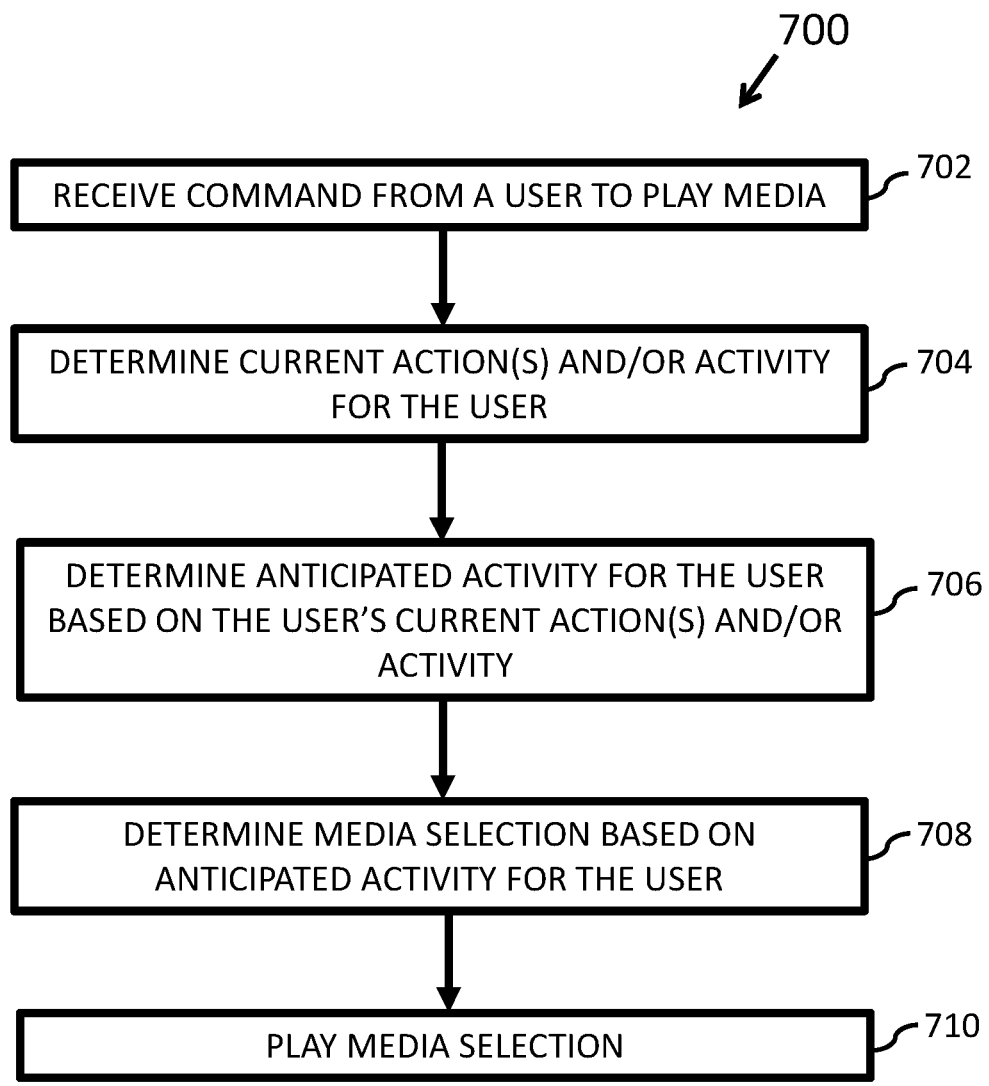
FIG. 7 is a schematic flow chart diagram illustrating another embodiment of a method for playing a media selection based on an anticipated activity.

FIG. 7 is a schematic flow chart diagram illustrating another embodiment of a method 600 for playing a media selection based on an anticipated activity. At least in the illustrated embodiment, the method 700 begins by a processor (e.g., processor 110) receiving a command to play a media file (block 702). Here, the processor 110 may not know what the user is currently doing and/or is scheduled to do in the future.

In response to the voice command, the processor 110 determines the action(s) and/or activity that the user is current performing (block 704). The processor 110 may determine the user's current action(s) and/or current activity using any of the various embodiments, operations, and/or functions of a processor 110 for determining the action(s) and/or activity that the user is current performing discussed elsewhere herein.

The processor 110 determines an anticipated activity for the user based on the determined current action(s) and/or current activity for the user (block 706). The processor 110 may determine the anticipated activity using any of the various embodiments, operations, and/or functions of a computing device 100 for determining the anticipated activity discussed elsewhere herein.

Further, the processor 110 makes a media selection based on the determined anticipated activity (block 708). In other words, the processor 110 selects a media for the user based on the anticipated activity for the user. The media selection is a type of media and/or particular media that corresponds to, is assigned to, and/or is associated with the anticipated activity. The processor 110 may select the media corresponding to the determined anticipated activity using any of the various embodiments, operations, and/or functions of a processor 110 for performing a media selection discussed elsewhere herein.

The processor 110 begin playing the media selection (block 710). That is, the processor 110 can begin playing the media that corresponds to, is assigned to, and/or is associated with the anticipated activity. As discussed elsewhere herein, the media selection can be played on one or more displays 102 and/or one or more audio output devices 104.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory configured to store code executable by the processor to:
maintain a media repository in the memory, the media repository storing at least one of visual media and audio media;
detect one or more actions being currently performed by the user,
determine an anticipated activity for a user based solely on the detected one or more actions being currently performed by the user, wherein the anticipated activity corresponds to an activity scheduled by the user,
in response to determining that the detected one or more actions being currently performed by the user are the anticipated activity, make a preset playlist selection from the at least one of the visual media and the audio media stored in the media repository corresponding to the determined anticipated activity, wherein:
the preset playlist selection corresponds to the anticipated activity, and
the preset playlist selection is based on the user associating the preset playlist selection and the anticipated activity prior to the activity being scheduled by the user, and
in response to making the preset playlist selection, automatically play the preset playlist selection without user input.

2. The apparatus of claim 1, wherein the processor is configured to utilize a data repository to determine the anticipated activity.

3. The apparatus of claim 2, wherein:
the data repository comprises a calendar including a schedule for the user; and
the processor is configured to determine the anticipated activity based on the schedule included in the calendar.

4. The apparatus of claim 1, further comprising:
one or more sensors in communication with the processor, the one or more sensors configured to:
detect one or more physical properties in an environment within which the one or more sensors reside,
generate sensor data identifying each of the one or more physical properties detected in the environment, and
transmit the generated sensor data to the processor,
wherein the processor is further configured to:
receive the generated sensor data, and
determine the anticipated activity based on each of the one or more identified physical properties detected in the environment.

5. The apparatus of claim 1, wherein, in making the preset playlist selection for the user corresponding to the determined anticipated activity, the processor is configured to:
determine a type of media associated with the determined anticipated activity; and
play the determined type of media as the preset playlist selection.

6. The apparatus of claim 1, wherein, in making the preset playlist selection for the user corresponding to the determined anticipated activity, the processor is configured to:
determine a type of media associated with the determined anticipated activity;
determine one or more media files within the determined type of media associated with the determined anticipated activity; and
play the determined one or more media files as the preset playlist selection.

7. The apparatus of claim 1, wherein, in automatically playing the preset playlist selection, the processor is configured to one of:
automatically play the preset playlist selection prior to the user participating in the anticipated activity;
automatically play the preset playlist selection while the user is participating in the anticipated activity; and
automatically play the preset playlist selection prior to the user participating in the anticipated activity and while the user is participating in the anticipated activity.

8. A method, comprising:
maintaining, by a processor of a computing device, a media repository in a memory of the computing device, the media repository storing at least one of visual media and audio media;
detecting, by the processor, one or more actions being currently performed by the user;
determining, by the processor, an anticipated activity for a user based solely on the detected one or more actions being currently performed by the user, wherein the anticipated activity corresponds to an activity scheduled by the user;
making, by the processor in response to determining that the detected one or more actions being currently performed by the user are the anticipated activity, a preset playlist selection from the at least one of the visual media and the audio media stored in the media repository corresponding to the determined anticipated activity, wherein:
the preset playlist selection corresponds to the anticipated activity, and
the preset playlist selection is based on the user associating the preset playlist selection and the anticipated activity prior to the activity being scheduled by the user; and
automatically playing, by the processor in response to making the preset playlist selection, the preset playlist selection without user input.

9. The method of claim 8, wherein determining the anticipated activity comprises utilizing a data repository to determine the anticipated activity.

10. The method of claim 9, wherein:
the data repository comprises a calendar including a schedule for the user; and
determining the anticipated activity comprises determining the anticipated activity based on the schedule included in the calendar.

11. The method of claim 8, further comprising:
receiving sensor data identifying one or more physical properties detected in an environment,
wherein determining the anticipated activity comprises determining the anticipated activity based on each of the one or more physical properties detected in the environment that are identified in the received sensor data.

12. The method of claim 8, wherein making the preset playlist selection for the user corresponding to the determined anticipated activity comprises:
  determining a type of media associated with the determined anticipated activity; and
  playing the determined type of media as the preset playlist selection.

13. The method of claim 8, wherein making the preset playlist selection for the user corresponding to the determined anticipated activity comprises:
  determining a type of media associated with the determined anticipated activity;
  determining one or more media files within the determined type of media associated with the determined anticipated activity; and
  playing the determined one or more media files as the preset playlist selection.

14. The method of claim 8, wherein automatically playing the preset playlist selection comprises one of:
  automatically playing the preset playlist selection prior to the user participating in the anticipated activity;
  automatically playing the preset playlist selection while the user is participating in the anticipated activity; and
  automatically playing the preset playlist selection prior to the user participating in the anticipated activity and while the user is participating in the anticipated activity.

15. A computer program product comprising a computer-readable storage device including code embodied therewith, the code executable by a processor to cause the processor to:
  maintain a media repository in a memory of a computing device, the media repository storing at least one of visual media and audio media;
  detect one or more actions being currently performed by the user;
  determine an anticipated activity for a user based solely on the detected one or more actions being currently performed by the user, wherein the anticipated activity corresponds to an activity scheduled by the user;
  in response to determining that the detected one or more actions being currently performed by the user are the anticipated activity, make a preset playlist selection from the at least one of the visual media and the audio media stored in the media repository corresponding to the determined anticipated activity, wherein:
    the preset playlist selection corresponds to the anticipated activity, and
    the preset playlist selection is based on the user associating the preset playlist selection and the anticipated activity prior to the activity being scheduled by the user, and
  in response to making the preset playlist selection, automatically play the preset playlist selection without user input.

16. The computer program product of claim 15, wherein:
  the code further causes the processor to utilize a calendar including a schedule for the user to determine the anticipated activity; and
  the code that causes the processor to determine the anticipated activity further comprises code that causes the processor to determine the anticipated activity based on the schedule included in the calendar.

17. The computer program product of claim 15, wherein:
  the code further causes the processor to receive sensor data identifying one or more physical properties detected in an environment; and
  the code that causes the processor to determine the anticipated activity further comprises code that causes the processor to determine the anticipated activity based on each of the one or more physical properties detected in the environment that are identified in the received sensor data.

18. The computer program product of claim 15, wherein the code that causes the processor to make the preset playlist selection for the user corresponding to the determined anticipated activity further comprises code that causes the processor to:
  determine a type of media associated with the determined anticipated activity; and
  play the determined type of media as the preset playlist selection.

19. The computer program product of claim 15, wherein the code that causes the processor to make the preset playlist selection for the user corresponding to the determined anticipated activity further comprises code that causes the processor to:
  determine a type of media associated with the determined anticipated activity;
  determine one or more media files within the determined type of media associated with the determined anticipated activity; and
  play the determined one or more media files as the preset playlist selection.

20. The computer program product of claim 15, wherein the code that causes the processor to automatically play the preset playlist selection further comprises code that causes the processor to one of:
  automatically play the preset playlist selection prior to the user participating in the anticipated activity;
  automatically play the preset playlist selection while the user is participating in the anticipated activity; and
  automatically play the preset playlist selection prior to the user participating in the anticipated activity and while the user is participating in the anticipated activity.

* * * * *